(12) United States Patent
Kowarz et al.

(10) Patent No.: US 6,611,380 B2
(45) Date of Patent: Aug. 26, 2003

(54) SYSTEM AND METHOD FOR CALIBRATION OF DISPLAY SYSTEM WITH LINEAR ARRAY MODULATOR

(75) Inventors: Marek W. Kowarz, Henrietta, NY (US); Donald J. Stauffer, Penfield, NY (US); James G. Phalen, Rochester, NY (US); John C. Brazas, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/037,954

(22) Filed: Dec. 21, 2001

(65) Prior Publication Data

US 2003/0117711 A1 Jun. 26, 2003

(51) Int. Cl.[7] .......................... G02B 27/10; G02B 26/00
(52) U.S. Cl. ........................................ 359/618; 359/291
(58) Field of Search ................................ 359/290, 619, 359/618, 627, 563, 572, 291, 298; 348/755, 753, 745; 353/30, 34, 37

(56) References Cited

U.S. PATENT DOCUMENTS

| 4,868,668 | A |  | 9/1989 | Tavernetti |  |
|---|---|---|---|---|---|
| 5,386,253 | A |  | 1/1995 | Fielding |  |
| 5,982,553 | A |  | 11/1999 | Bloom et al. |  |
| 6,052,166 | A | * | 4/2000 | Chikazawa | 349/116 |
| 6,476,848 | B2 | * | 11/2000 | Kowarz et al. | 347/255 |
| 6,307,663 | B1 |  | 10/2001 | Kowarz |  |
| 6,384,959 | B1 | * | 5/2002 | Furlani et al. | 359/291 |
| 6,411,425 | B1 | * | 6/2002 | Kowarz et al. | 359/291 |

* cited by examiner

Primary Examiner—Georgia Epps
Assistant Examiner—Saeed Seyrafi
(74) Attorney, Agent, or Firm—Stephen H. Shaw

(57) ABSTRACT

A system and method for calibration of a display system with a linear modulator array that includes: a light source; a linear array of light modulating devices driven by a controller; a projection lens system that creates a line image of the linear array on a screen; a scanning mirror that sweeps the line image across the screen to form a two-dimensional scene; and an image sensor containing an area array of light sensitive detectors that captures image intensity data from the two-dimensional scene and transmits the image intensity data to the controller, wherein the controller converts the image intensity data into a one-dimensional array of correction factors for the linear array of light modulating devices.

31 Claims, 8 Drawing Sheets

SYSTEM AND METHOD FOR CALIBRATION OF DISPLAY SYSTEM WITH LINEAR ARRAY MODULATOR

FIELD OF THE INVENTION

The present invention relates to the calibration of a display system employing a linear array of light modulators, and more particularly to a display system with a linear array of conformal GEMS devices and an image sensor for uniformity calibration.

BACKGROUND OF THE INVENTION

Many display systems, including large screen TVs, conference room projectors, and digital cinema projectors generate an output image by employing a spatial light modulator that receives light from a light source to impart image information on a uniform light field. At present in such display systems, the light source is typically a white light lamp and the spatial light modulator is typically an area array containing liquid crystal devices or micromirror devices. Alternative projection display architectures, with one or more laser light sources and spatial light modulators that are linear arrays of electromechanical grating devices, have been demonstrated and show much promise for the future. For a display system with a linear array architecture, a scanning mirror is used to generate a two-dimensional scene from a projected one-dimensional image of the linear array.

A system and method for calibrating a display system with a linear array of Grating Light Valves (GLV) was published by R. W. Corrigan et al. in "Calibration of a Scanned Linear Grating Light Valve Projection System," SID '99 Digest, pp. 220–223. The calibration method described by Corrigan uses a single detector to calibrate an entire linear GLV array. The correction factors for each device on the array are obtained by focusing the output of the entire array on the detector, turning on the devices one by one, and measuring the resulting light output. In this device-by-device approach, the entire background signal of the array is measured in addition to the light output of a single device. If the background signal is sufficiently high, there are problems with the signal-to-noise ratio in determining the correction factors needed to produce a uniform flat field. This signal-to-noise ratio problem is especially pronounced in calibrating the flat field of a low intensity gray level. As an example, in the calibration of the 5% intensity flat-field for a GLV array with 1000 devices and a contrast ratio of 1000:1, the background signal is 20 times larger than the output intensity from a single device. An additional disadvantage is that a device-by-device approach does not readily produce accurate calibration factors for a uniform flat field because the outputs of adjacent devices may not add linearly (for example, the output intensity measured when two adjacent devices are turned on is not equal to twice the intensity of a single device). This output non-linearity is due to changes in the diffraction pattern that occur when adjacent devices are turned on. The diffraction effects are even more pronounced when using light sources with high coherence, such as lasers. A third disadvantage is that the device-by-device approach does not directly calibrate the flat field on the screen as seen by a viewer.

Calibration systems for displays with two-dimensional modulator arrays have been disclosed that sample the output and generate correction factors to improve image quality. Specifically, U.S. Pat. No. 5,386,253, entitled "Projection Video Display Systems," by Fielding, Jan. 31, 1995, discloses the use of one or more point detectors that measure light reflected from the screen to determine the appropriate correction factor. The signal-to-noise ratio problem mentioned earlier becomes even more pronounced for this system. An alternative approach, described in U.S. Pat. No. 4,868,668, entitled "System And Method For Image Adjustment In An Optical Projection System," by Tavernetti, Sep. 19, 1989, uses a two-dimensional CCD array to determine correction factors by sampling a portion of the light emerging from the two-dimensional modulator array. This particular approach cannot be used in a display system with a linear array modulator without the addition of data processing electronics to generate the appropriate correction factors for the linear array modulator from the two-dimensional CCD data.

A significant problem with display systems that employ linear array modulators is that even a slight non-uniformity in the projected one-dimensional image produces parallel bands in the two-dimensional scene that are noticeable and objectionable to many viewers. A calibration system is required to reduce these objectionable bands in the two-dimensional scene. There is a need, therefore, for an improved calibration system for a display with a scanned linear array modulator that corrects image banding and avoids the problems noted above.

SUMMARY OF THE INVENTION

The above need is met according to the present invention by providing a system and method for calibration of a display system with a linear modulator array that includes: a light source; a linear array of light modulating devices driven by a controller, a projection lens system that creates a line image of the linear array on a screen; a scanning mirror that sweeps the line image across the screen to form a two-dimensional scene; and an image sensor containing an area array of light sensitive detectors that captures image intensity data from the two-dimensional scene and transmits the image intensity data to the controller, wherein the controller converts the image intensity data into a one-dimensional array of correction factors for the linear array of light modulating devices.

DETAILED DESCRIPTION OF THE INVENTION

In the following description, embodiments of the present invention include a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
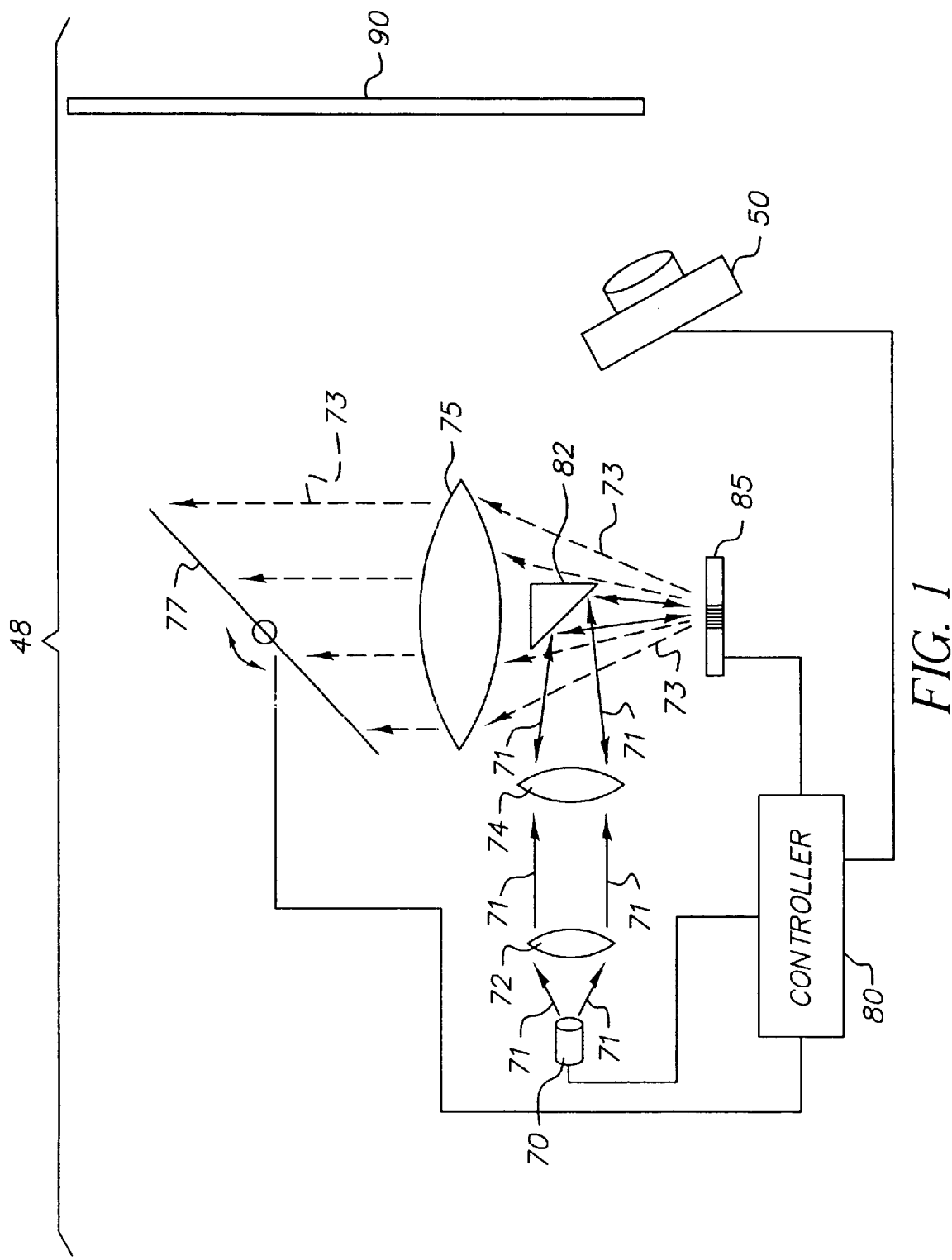
FIG. 1 illustrates a projection display system that contains a linear array modulator and an image sensor for calibration of the present invention.

FIG. 1 shows a display system 48 containing a spatial light modulator with a linear array 85 of individually operable devices. Light is emitted from a source 70 and conditioned by a pair of lenses 72 and 74 before hitting a turning mirror 82 and illuminating the linear array 85. The display system of FIG. 1 forms an entire flicker-free two-dimensional scene on the screen 90 from a one-dimensional linear array modulator. The devices of the linear array 85 must therefore be capable of rapidly modulating incident light to produce multiple lines of pixels with gray levels. Electromechanical grating devices are the only well-developed spatial and temporal light modulators that, at the present time, can provide the required response times at low cost. More specifically, the preferred modulators are either the conformal Grating ElectroMechanical System (GEMS) devices made by Eastman Kodak Company (see U.S. Pat. No. 6,307,663, entitled "Spatial Light Modulator With Conformal Grating Device," by Kowarz, Oct. 23, 2001 and U.S. patent application Ser. No. 09/867,927, entitled, "Method For Manufacturing A Mechanical Conformal Grating Device," by Kowarz, et al., May 30, 2001); or the Grating Light Valves (GLV) made by Silicon Light Machines, disclosed in U.S. Pat. No. 5,982,553, entitled, "Display Device Incorporating One-Dimensional Grating Light-Valve Array," by Bloom et al., Nov. 9, 1999. As depicted in FIG. 1, the linear array 85 contains conformal GEMS devices. A more detailed description of display system 48 based on scanning linear arrays of conformal GEMS devices can be found in U.S. patent application Ser. No. 09/671,040, now U.S. Pat. No. 6,411,425 "Electromechanical Grating Display System with Spatially Separate Light Beams," filed Sep. 27, 2000 by Kowarz, Brazas and Phalen.

In FIG. 1, the controller 80 selectively activates the linear array 85 to obtain the desired pixel pattern for a given line of a two-dimensional scene. If a particular conformal GEMS device is not actuated, it reflects the incident light beam primarily into the 0th order light beam, which is directed back towards the source 70 by the turning mirror 82. If the device is actuated, it diffracts the incident light beams primarily into $+2^{nd}$, $+1^{st}$, $-1^{st}$ and $-2^{nd}$ order light beams. These diffracted beams pass around the turning mirror 82 and are projected on the screen 90 by the projection lens system 75. The scanning mirror 77 sweeps the line image across the screen 90 to form the two-dimensional scene. The controller 80 provides synchronization between the sweep of the scanning mirror 77 and the data stream that provides the scene content.

Figure 2:
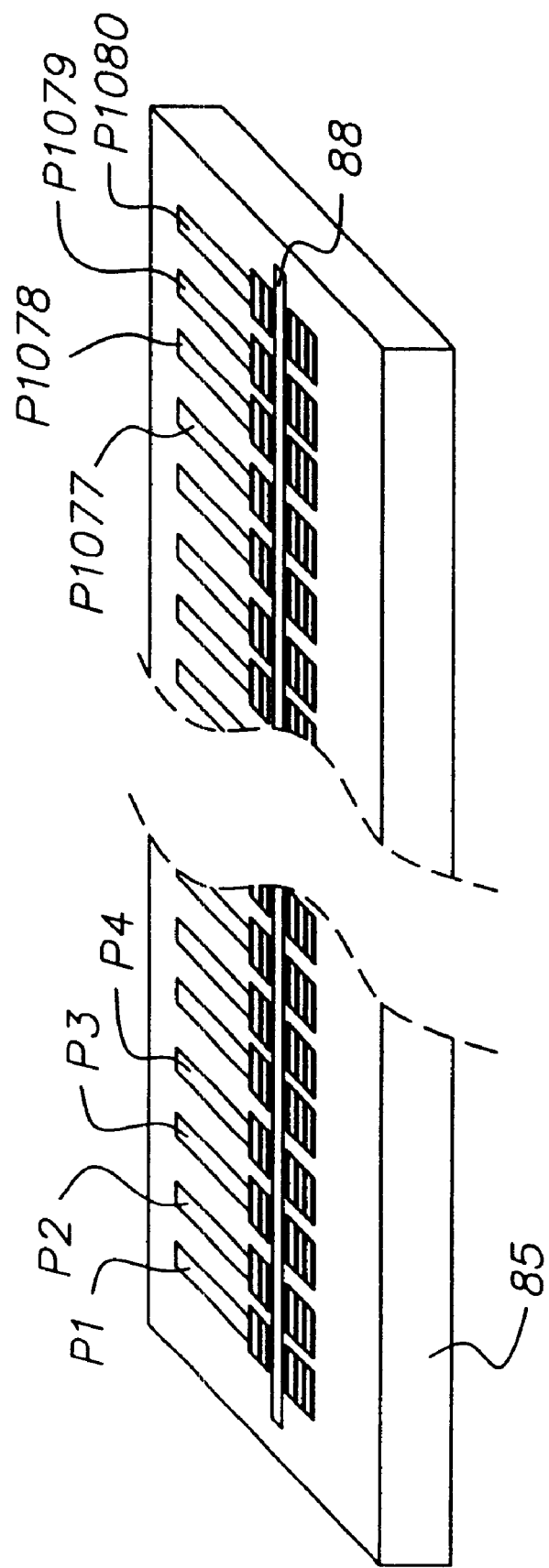
FIG. 2 illustrates an illuminated linear array of conformal GEMS devices for the present invention.
Figure 3:
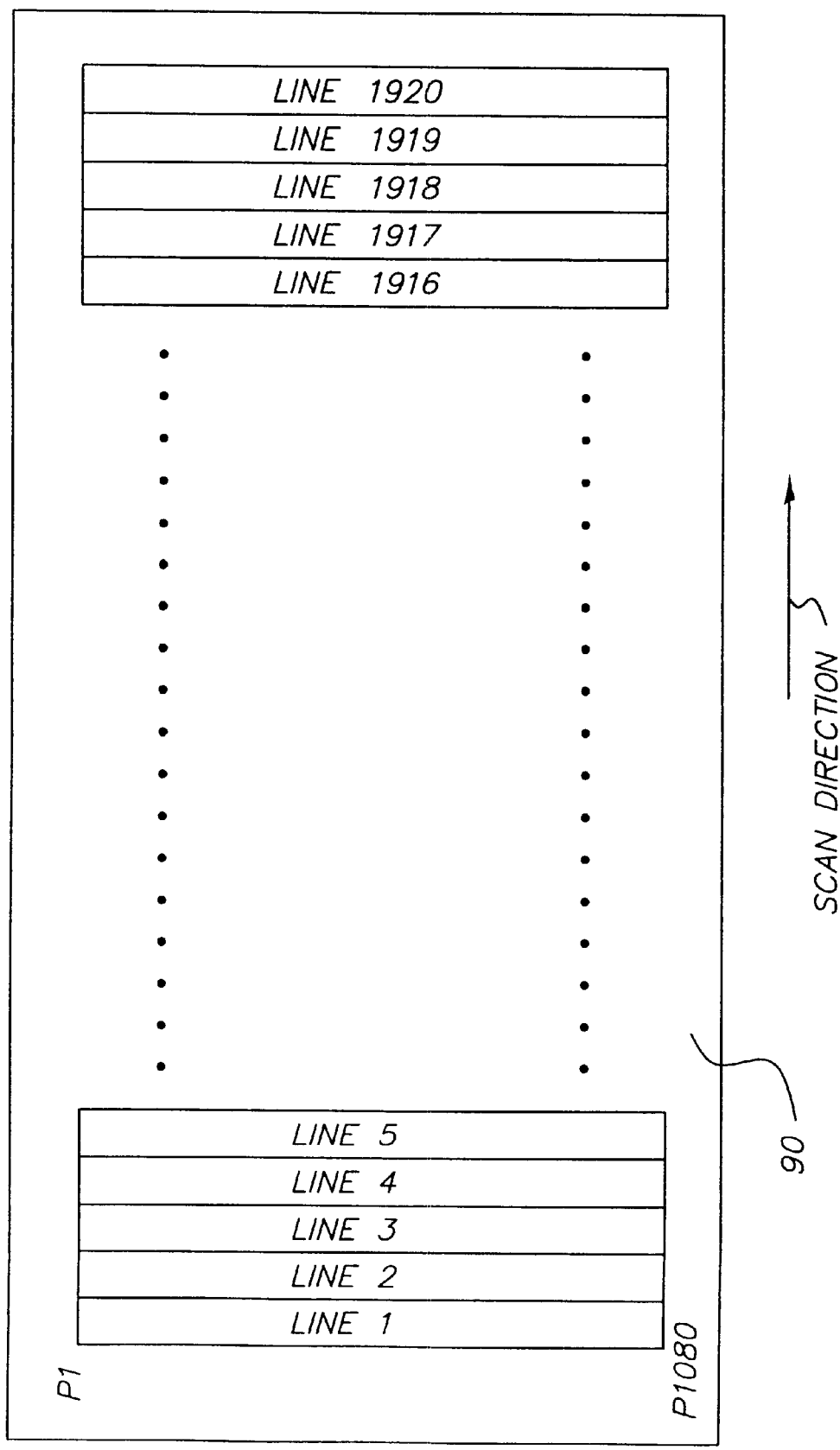
FIG. 3 illustrates the formation of a two-dimensional scene by scanning the projected one-dimensional image of a linear array modulator for the present invention.

FIG. 2 depicts a linear array 85 of conformal GEMS devices illuminated by a line of light 88. For illustration purposes, there are 1080 individually operable conformal GEMS devices shown, labeled P1 through P1080. FIG. 3 is a view facing the screen 90 showing the formation of the two-dimensional scene. In this illustration, HDTV resolution is obtained by scanning the image of the linear array 85 of 1080 conformal GEMS devices to generate 1920 sequential lines, thereby producing a scene with 1080 by 1920 pixels.

The projection display system of FIG. 1 generates gray levels in the scene from code values in the data stream. Gray levels are obtained by using a look-up-table (LUT) to determine the required actuation voltage waveform for the devices of the linear array 85 based on the code value in the data stream. For conformal GEMS devices that generate gray levels through pulse width modulation, the LUT provides conversion between code values in the data stream and pulse-width modulated voltage pulses appropriate for actuating the devices. In addition, calibration of non-uniformities is possible if the LUT also allows a different correspondence between code values and gray levels for each of the devices of the linear array 85.

Figure 4A:
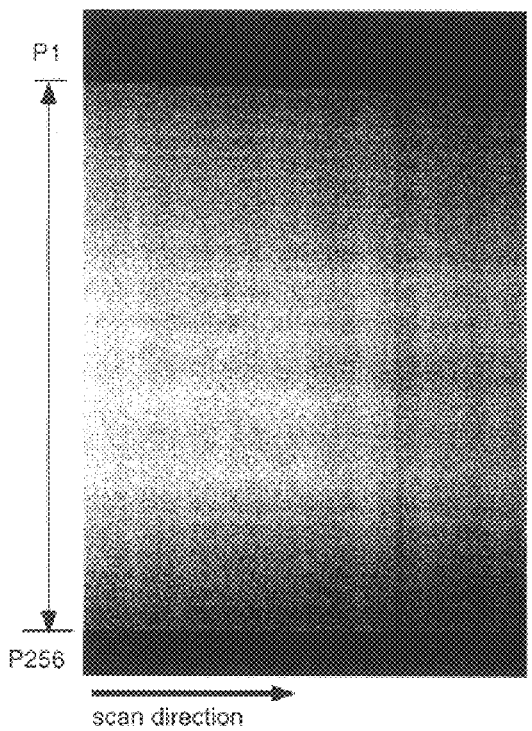
FIG. 4A is a rendition of a photograph of an uncalibrated flat field scene showing horizontal banding without the use of the present invention.

The process of generating a two-dimensional scene by scanning a linear array can lead to image banding, which can be very noticeable because of the sensitivity of the human visual response to such artifacts. These bands can arise from non-uniformities in the illumination beam and projection optics, and from variations of the device response along the array. FIG. 4A is a rendition of a photograph taken from a prototype projection display system with an uncalibrated flat field projected on a screen 90. This prototype system contains a linear array with 256 conformal GEMS devices. The uncalibrated flat field is generated by sending a data stream to the controller 80 with equal code values for each device on the linear array 85. The two-dimensional scene is formed by re-imaging the non-zero diffracted orders of the linear array onto the screen 90 and using a galvanometer to sweep the line image across the screen 90. Parallel horizontal banding artifacts are clearly visible in the uncalibrated flat field along the scan direction. The bands are generated by the vertical non-uniformity that is present in the line image of the uncalibrated linear array.

To obtain correction factors for creating a uniform calibrated flat field scene, an image sensor 50 is added to the display system of FIG. 1. For calibration, the controller 80 turns on the linear array 85 so that, initially, an uncalibrated flat field scene is projected on the screen 90. The image sensor 50 is used to capture an image of the uncalibrated flat field. As drawn in FIG. 1, the image sensor is a two-dimensional area array of light sensitive detectors incorporated into a digital camera. A precise estimate of the required correction factors requires an image sensor with a resolution along the device axis (vertical axis in FIGS. 3, 4A and 4B) larger than the number of devices on the linear array 85. However, for lower frequency banding artifacts, such as those caused by illumination non-uniformity, reasonable correction can be obtained with lower sensor resolution. The image intensity data from the image sensor 50 is processed by the controller 80 to generate the appropriate correction factors for each device on the linear array 85. These correction factors are used to modify the LUT for converting code values in the data stream to actuation voltage waveforms for each device, thereby adjusting the gray levels. If necessary, the calibration steps can be repeated to optimize the uniformity of the flat field scene. This calibration process can be performed for additional gray levels of the flat field scene to assure uniformity throughout the gray scale needed for image display.

Figure 4B:
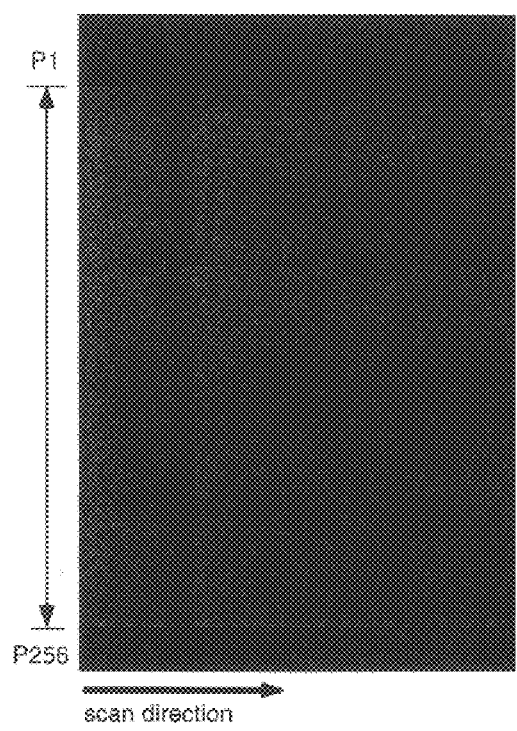
FIG. 4B is a rendition of a photograph of a calibrated flat field scene after use of the present invention.

FIG. 4B is a rendition of a photograph of the calibrated flat field scene (same system as FIG. 4A) after repeating the above calibration procedure several times. The horizontal banding visible in FIG. 4A is eliminated by calibration. The conformal GEMS array in this system produces gray levels through pulse width modulation. A particular gray level is produced by actuating the devices for a certain portion of the line time used to generate a vertical line of pixels. The correction factors are used to modify the LUT assignment for each device of the linear array between input code values and the pulse width of the actuation voltages.

Calibration requires processing the image intensity data of the flat field to obtain a correction factor for each device of the linear array 85. One scheme for generating these correction factors is to average the image intensity data along the horizontal scan direction, with correction for any known skew or distortion created by the display system, camera system, or viewing conditions. The horizontal averaging reduces the two-dimensional image intensity data to a one-dimensional array of values corresponding to the average horizontal intensity. The averaging process improves signal-to-noise ratio for determining the appropriate correction factor. Noise from several different sources can be suppressed in this manner, including speckle in the projected image, local non-uniformity in the screen, and noise in the image sensor. As was implied earlier, for most systems the number of data values in the one-dimensional array of average horizontal intensity will not necessarily match the number of modulating devices on the linear array 85. Therefore, the one-dimensional data set needs to be resampled to obtain a correction factor for each device of the linear array 85.

The above embodiment overcomes several limitations of the prior art relating to the calibration of a display system with a linear array modulator: 1) it provides a high signal-to-noise ratio for calibrating even low intensity gray levels; 2) it performs calibration on the entire flat field scene simultaneously, thereby avoiding any non-linear effects between adjacent pixels, and 3) it directly calibrates the scene on the screen as viewed by the audience.

Figure 5:
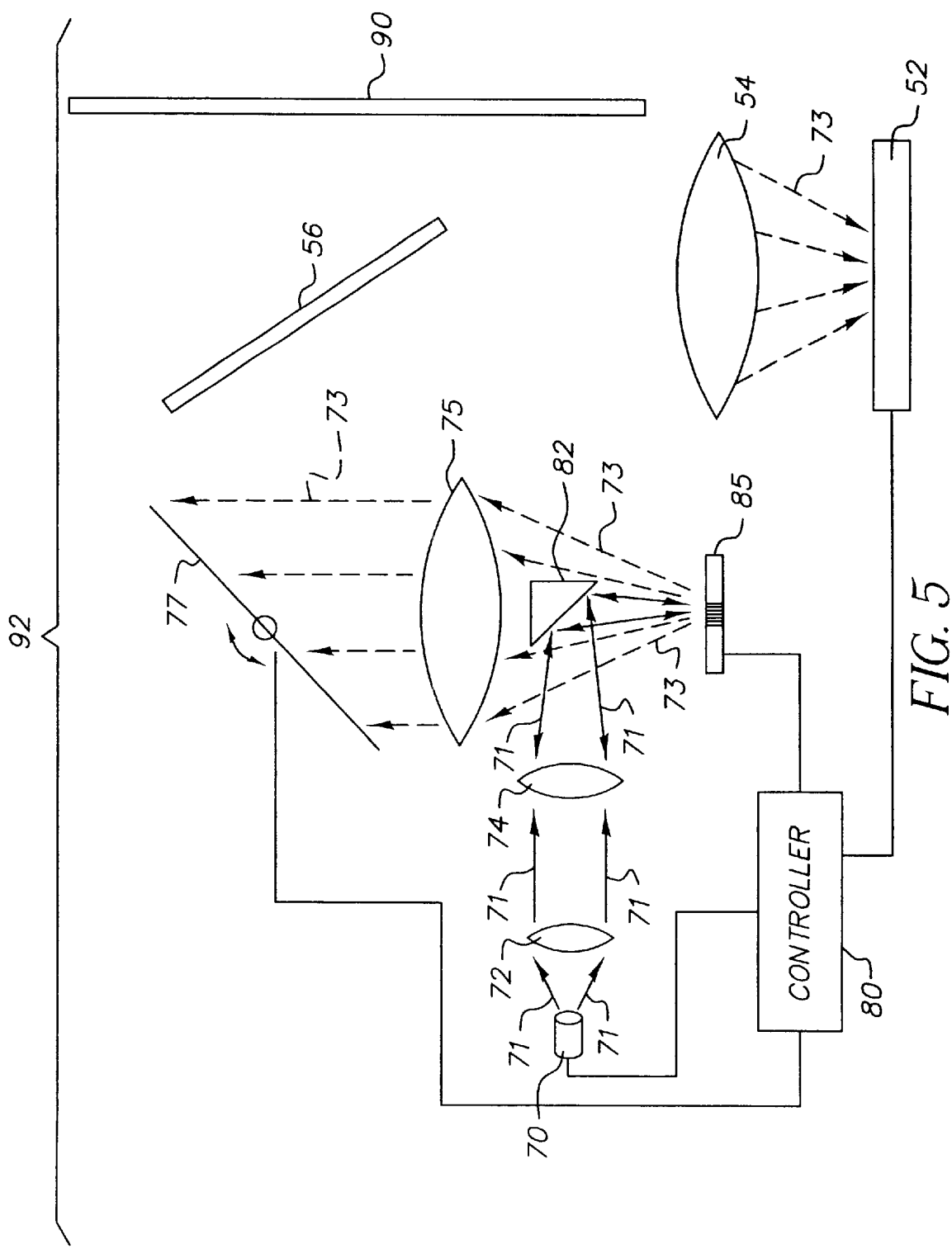
FIG. 5 illustrates an alternate embodiment of a projection display system with calibration.

It should be noted that alternate schemes for measuring the required calibration factors are within the scope of the present invention. FIG. 5 illustrates an alternate embodiment in which the calibration image is formed internally within the display system 92. A beam splitter plate 56 is used to redirect a small portion of the diffracted light 73 through an image-forming lens 54 that produces an image for calibration directly on the image sensor 52. The image sensor 52 in FIG. 5 is preferably an area array of light sensitive sensors that simultaneously captures the entire image intensity data for calibration. However, as is well-known to those skilled in the art, a linear array of sensors with time-sequential readout can be used to replace an area array of sensors.

Figure 6:
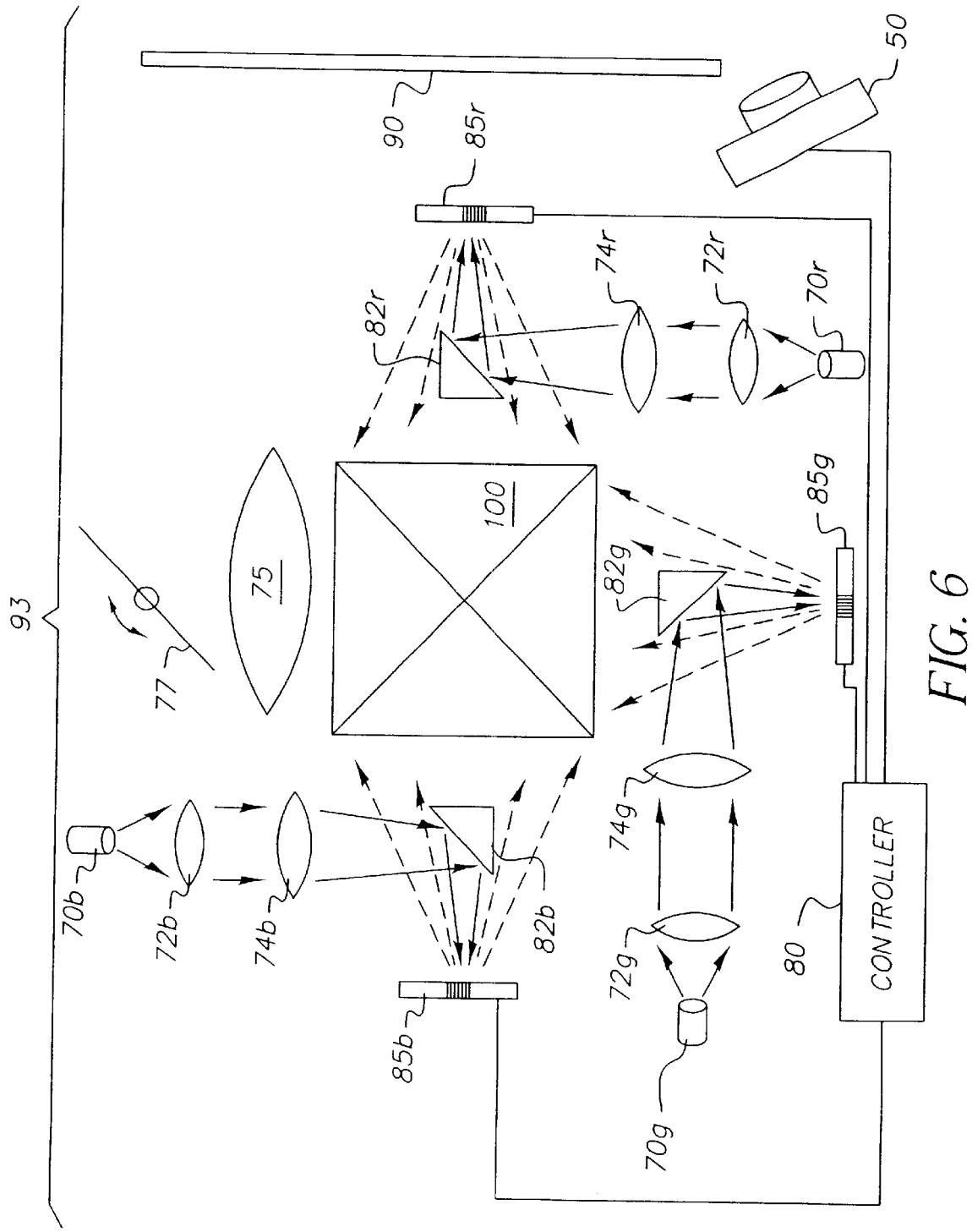
FIG. 6 illustrates a projection display system with calibration that produces simultaneous RGB for the present invention.

FIG. 6 illustrates implementation of the invention for a display system 93 that produces RGB simultaneously. The red, green and blue channels each have their own light sources (70r, 70g, and 70b), lenses (72r, 72g, 72b, 74r, 74g, and 74b), turning mirrors (82r, 82g, and 82b) and linear arrays of light modulating devices (85r, 85g, and 85b). A color combining cube 100 is used to direct the red, green and blue outputs through the projection lens system 75 and onto the screen 90. Using the approach discussed earlier, the image sensor 50 is used to capture the image intensity data needed to generate the correction factors required for uniformity calibration of each of the three colors. For a monochrome image sensor 50, the three colors are calibrated one at a time. For an image sensor 50 with an RGB color filter array, the calibration may be performed simultaneously for all three colors. The correction factors are used to modify the LUT assignment of the gray levels for each of the three linear arrays (85r, 85g, and 85b). The image intensity data can also be used to adjust the LUT assignments of the red, green and blue images to obtain a desired color balance.

In the RGB display system of FIG. 6, precise pixel registration is needed between the three linear arrays to obtain high quality images. The image sensor 50 can be used to capture offset factors for calibration of pixel registration along the horizontal direction. To perform offset calibration, an offset test pattern, preferably consisting of vertical lines with high spatial frequency, is projected on the screen. The offset factors are determined by comparing the relative alignment of the three RGB images captured by the image sensor 50. Correction then involves a timing delay or advance between the data streams of the three linear arrays 85r, 85g, and 85b. The correction eliminates horizontal misalignment between the red, green and blue pixels on the screen 90.

Figure 7:
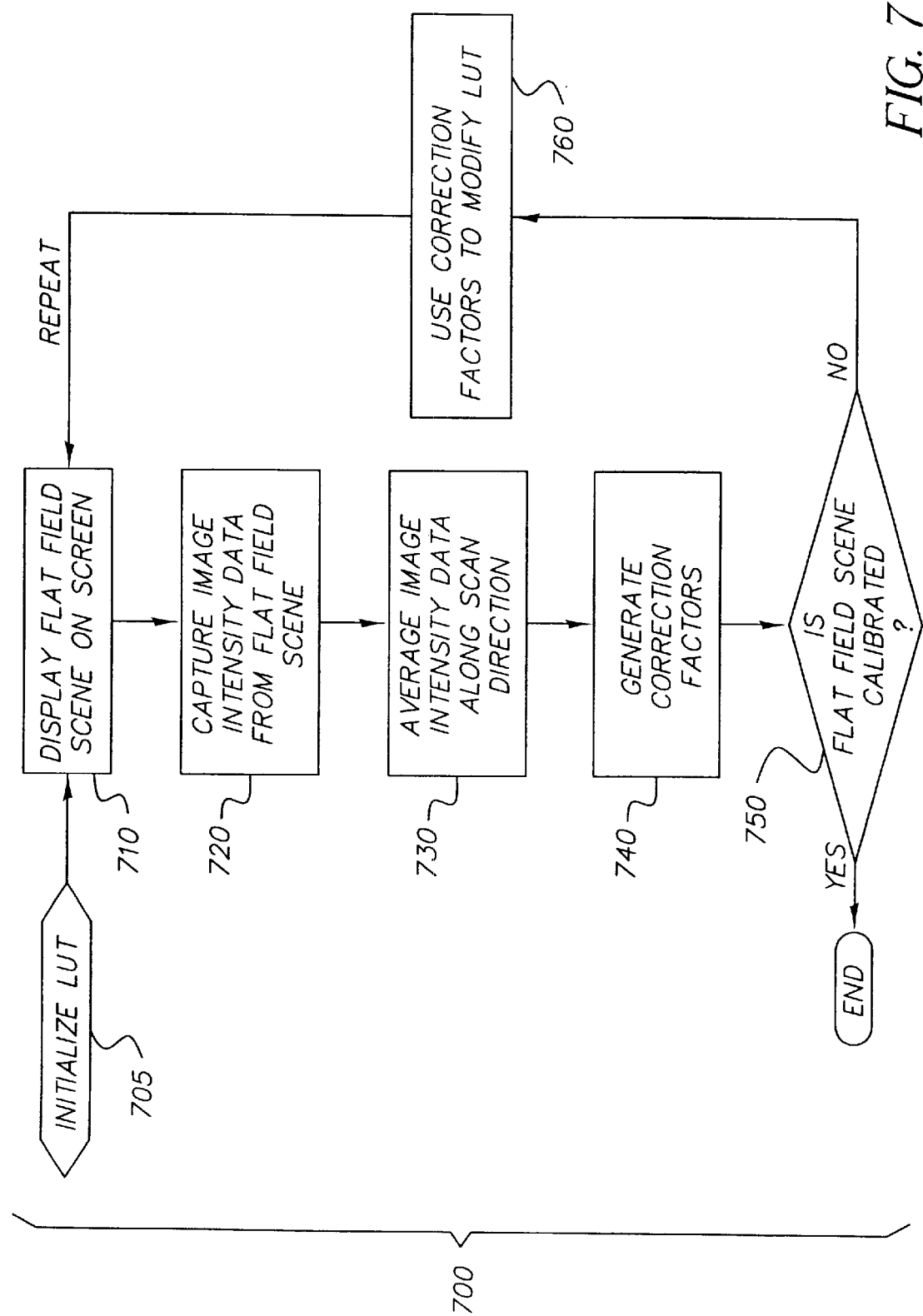
FIG. 7 is a flow diagram illustrating the calibration method of the present invention.

The purpose of the uniformity calibration process used in the projection display systems of FIGS. 1, 5, and 6 is modification of the gray scale LUT used to convert code values in the data stream to actuation voltage waveforms for the modulating devices on the linear array 85. The calibration process assures that a data stream with equal code values for each modulating device will produce a uniform flat field scene on the screen 90 and that a range of code values will produce the desired range of gray levels. Referring to FIG. 7, flow diagram 700, a method for calibrating a projection display having a scanned linear array modulator involves several operating steps. To start the calibration, operation 705 initializes the gray scale LUT. The appropriate initial values depend on the particular type of linear array modulator in the projection display. For the conformal GEMS device, a linear relation between input code values and actuation voltage pulse widths has been found to work well during calibration. In operation 710, a flat field scene is displayed on the screen. To determine the level of non-uniformity, operation 720 causes image intensity data to be captured from the nominally flat field scene. The correction factors needed to generate a uniform flat field scene are calculated by appropriately processing the two-dimensional image intensity data. For example, in operations 730 and 740, this data processing is accomplished by averaging the image intensity data along the scan direction and determining the required correction factors for the gray scale LUT from the scan-averaged data. A re-sampling of the scan-averaged image intensity data may also be required (not shown). In any event, the subsequent operation 750 determines whether the flat field scene is sufficiently well calibrated. A uniformity metric is needed for this decision, such as the standard deviation of the newly calculated correction factors. If the standard deviation is below a certain threshold, the calibration procedure is terminated. Otherwise, operation 760 modifies the gray scale LUT using the correction factors and operations 710–750 are repeated. The calibration process is iterated until the flat field scene is sufficiently uniform as determined by the uniformity metric.

Figure 8:
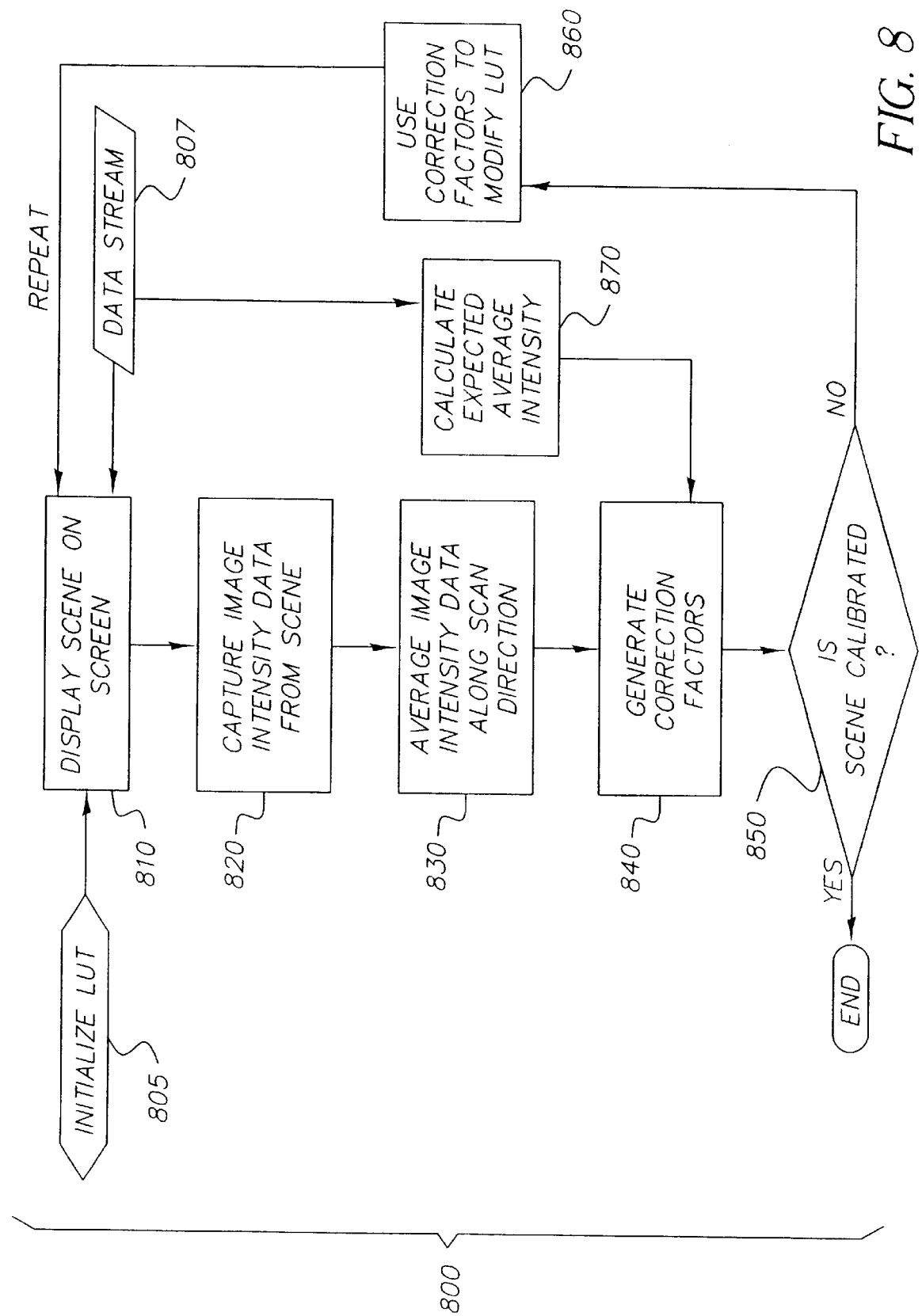
FIG. 8 is a flow diagram illustrating an alternative calibration method of the present invention.

FIG. 8, flow diagram 800, shows an alternative method for calibrating a projection display containing a scanned linear array modulator. Unlike the previous method, this approach does not require projection of a flat field scene. It can also be applied during the projection of scenes with real image content. The gray scale LUT is first initialized by operation 805. A data stream, continuously fed into the display system (operation 807), is used for two purposes: to display scenes on the screen (operation 810) and to provide a reference for calculating correction factors (operation 870). The scenes may contain images designed specifically for uniformity calibration or may contain ordinary motion images for display to a viewing audience. Operations 820 and 830 cause image intensity data to be captured and averaged along the scan direction. At the same time, operation 870 calculates the average expected intensity from the data stream. To calculate the required correction factors, operation 840 compares the scan-averaged image intensity data to the average expected intensity. The standard deviation of the correction factors, or another suitable metric, is used by operation 850 to determine whether the gray scale LUT should be adjusted by performing operation 860. The method can be iterated as needed.

The invention has been described in detail with particular reference to certain preferred embodiments thereof, but it will be understood that variations and modifications can be effected within the spirit and scope of the invention.

PARTS LIST

- 48 display system
- 50 image sensor
- 52 image sensor
- 54 image-forming lens
- 56 beam splitter plate
- 70 light source
- 70r red light source
- 70g green light source
- 70b blue light source
- 71 incident light beam
- 72 first lens
- 72r red first lens
- 72g green first lens
- 72b blue first lens
- 73 diffracted light beam
- 74 second lens
- 74r red second lens
- 74g green second lens
- 74b blue second lens
- 75 projection lens system
- 77 scanning mirror
- 80 controller
- 82 turning mirror
- 82r red turning mirror
- 82g green turning mirror
- 82b blue turning mirror
- 85 linear array
- 85r red linear array
- 85g green linear array
- 85b blue linear array
- 88 line of light
- 90 screen
- 92 alternate display system
- 93 alternate display system
- 100 color combining cube
- 700 flow diagram for a method for calibrating a projection display having a scanned linear array modulator
- 705 initializing look-up table (LUT) operation
- 710 displaying flat field scene operation
- 720 capturing image intensity data from flat field scene operation
- 730 averaging image intensity data operation
- 740 generating correction factors operation
- 750 calibration decision operation
- 760 modifying LUT operation
- 800 flow diagram for an alternative method for calibrating a projection display containing a scanned linear array modulator
- 805 initializing look-up table (LUT) operation
- 807 data stream
- 810 displaying scene operation
- 820 capturing image intensity data from scene operation
- 830 averaging image intensity data operation
- 840 generating correction factors operation
- 850 calibration decision operation
- 860 modifying LUT operation
- 870 calculating expected average intensity operation
- P1–P1080 individually operable conformal GEMS device

What is claimed is:

1. A calibrated projection display system, comprising:
    a) a light source;
    b) a linear array of light modulating devices driven by a controller;
    c) a projection lens system that creates a line image of the linear array on a screen;
    d) a scanning mirror that sweeps the line image across the screen to form a two-dimensional scene; and
    e) an image sensor containing an area array of light sensitive detectors that captures image intensity data from the two-dimensional scene and transmits the image intensity data to the controller, wherein the controller converts the image intensity data into a one-dimensional array of correction factors for the linear array of light modulating devices.

2. The calibrated projection display system as claimed in claim 1 wherein the conversion of image intensity data into a one-dimensional array of correction factors is accomplished by averaging the image intensity data along a scan direction corresponding to the scanning mirror.

3. The calibrated projection display system as claimed in claim 2 wherein the averaging of the image intensity data reduces noise due to the screen.

4. The calibrated projection display system as claimed in claim 2 wherein the averaging of the image intensity data reduces noise due to the image sensor.

5. The calibrated projection display system as claimed in claim 1 wherein the linear array of light modulating devices comprises electro-mechanical grating devices.

6. The calibrated projection display system as claimed in claim 1 wherein the image intensity data is obtained from a flat field scene on the screen.

7. The calibrated projection display system as claimed in claim 1 wherein the image intensity data is obtained from at least two flat field scenes that have different gray levels.

8. The calibrated projection display system as claimed in claim 1 wherein the calibration projection display system is a three color system and the image intensity data includes corresponding image intensity data sets for each color.

9. A calibrated projection display system, comprising:
    a) a light source;
    b) a linear array of light modulating devices driven by a controller,
    c) a projection lens system that creates a line image of the linear array on a screen;
    d) a scanning mirror that sweeps the line image across the screen to form a two-dimensional scene; and
    e) a light sampling element that intercepts light from the linear array of light modulating devices and directs the intercepted light to an image sensor, wherein the image sensor captures image intensity data from the intercepted light, and transmits the image intensity data to the controller, wherein the controller converts the image intensity data into a one-dimensional array of correction factors for the linear array of light modulating devices.

10. The calibrated projection display system as claimed in claim 9 wherein the image sensor is an area array of light sensitive detectors that captures the two-dimensional scene as projected on the screen.

11. The calibrated projection display system as claimed in claim 10 wherein the conversion of image intensity data into a one-dimensional array of correction factors is accomplished by averaging the image intensity data along a scan direction corresponding to the scanning mirror.

12. The calibrated projection display system as claimed in claim 11 wherein the averaging of the image intensity data reduces noise due to the screen.

13. The calibrated projection display system as claimed in claim 11 wherein the averaging of the image intensity data reduces noise due to the image sensor.

14. The calibrated projection display system as claimed in claim 9 wherein the image sensor is a linear array of light sensitive detectors.

15. The calibrated projection display system as claimed in claim 9 wherein the linear array of light modulating devices comprises electro-mechanical grating devices.

16. The calibrated projection display system as claimed in claim 9 wherein the image intensity data is obtained from a flat field scene on the screen.

17. The calibrated projection display system as claimed in claim 9 wherein the image intensity data is obtained from at least two flat field scenes that have different gray levels.

18. The calibrated projection display system as claimed in claim 9 wherein the projection display system is a three color system and the image intensity data includes corresponding calibration data sets for each color.

19. A calibrated projection display system having simultaneous color output, comprising:
   a) at least two light sources with different color spectra;
   b) at least two linear arrays of light modulating devices driven by a controller,
   c) a projection lens system that creates line images of the at least two linear arrays on a screen;
   d) a scanning mirror that sweeps the line images across the screen to form a two-dimensional scene, and
   e) an image sensor containing an area array of light sensitive detectors that captures image intensity data from the two-dimensional scene and transmits the image intensity data to the controller, wherein the controller converts the image intensity data into one-dimensional arrays of correction factors for the at least two linear arrays of light modulating devices.

20. The calibrated projection display system having simultaneous color output claimed in claim 19, wherein the image intensity data is obtained from a two-dimensional scene containing an offset test pattern and the correction factors include timing delays between the at least two linear arrays of light modulating devices.

21. The calibrated projection display system having simultaneous color output claimed in claim 19, wherein the controller adjusts the correction factors of the at least two linear arrays of light modulating devices to obtain color balance of the two-dimensional scene.

22. A method for calibrating a projection display having a linear array modulator, comprising the steps of:

a) displaying a flat field scene upon a screen;
   b) capturing image intensity data from the flat field scene with an image sensor;
   c) converting the image intensity data into a one-dimensional array of correction factors for the linear array modulator; and
   d) repeating the above steps as necessary to obtain a calibrated flat field scene.

23. The method claimed in claim 22 wherein the step of converting the image intensity data into a one-dimensional array of correction factors involves averaging the image intensity data along a scan direction corresponding to a scanning mirror.

24. The method claimed in claim 23 wherein the process of generating the one-dimensional array of correction factors includes re-sampling of the averaged image intensity data.

25. The method claimed in claim 23 wherein the correction factors are used to modify a look-up-table used to generate gray levels.

26. The method claimed in claim 25 wherein the gray levels are obtained by pulse width modulation.

27. The method claimed in claim 22 wherein the projection display is a color projection display, and the correction factors are adjusted to achieve color balance.

28. A method for calibrating a projection display having at least two linear array modulators, comprising the steps of:
   a) projecting an offset test pattern upon the screen;
   b) capturing image intensity data from the projected offset test pattern with an image sensor;
   c) generating offset factors from the image intensity data; and
   d) adjusting relative timing delays between the at least two linear array modulators according to the offset factors.

29. A method for calibrating a projection display having a linear array modulator, comprising the steps of:
   a) displaying a scene upon a screen from a data stream;
   b) calculating an expected average intensity by appropriately averaging the data stream along a scan direction corresponding to a scanning mirror;
   c) capturing image intensity data from the scene with an image sensor;
   d) averaging the captured image intensity data along the scan direction;
   e) generating a one-dimensional array of correction factors for the linear array modulator by comparing the average captured image intensity data to the expected average intensity; and
   f) repeating the above steps as necessary to obtain a calibrated display.

30. The method claimed in claim 27 wherein the correction factors are used to modify a look-up-table used to generate gray levels.

31. The method claimed in claim 30 wherein the gray levels are obtained by pulse width modulation.

* * * * *

UNITED STATES PATENT AND TRADEMARK OFFICE
CERTIFICATE OF CORRECTION

PATENT NO. : 6,611,380 B2                                                   Page 1 of 1
DATED       : August 26, 2003
INVENTOR(S) : John C. Brazas et al.

It is certified that error appears in the above-identified patent and that said Letters Patent is hereby corrected as shown below:

Column 10,
Line 18, "23" should be -- 22 --
Line 55, "27" should be -- 29 --

Signed and Sealed this

Ninth Day of March, 2004

JON W. DUDAS
*Acting Director of the United States Patent and Trademark Office*